United States Patent
Toyohira et al.

(10) Patent No.: US 6,196,072 B1
(45) Date of Patent: Mar. 6, 2001

(54) STEERING TORQUE DETECTING DEVICE FOR CABLE-TYPE STEERING DEVICE

(75) Inventors: Tomoya Toyohira; Kouichi Suyama, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/348,467

(22) Filed: Jul. 7, 1999

(30) Foreign Application Priority Data

Jul. 8, 1998 (JP) .................................................. 10-193379

(51) Int. Cl.[7] ...................................................... G01L 3/02
(52) U.S. Cl. ...................................................... 73/862.333
(58) Field of Search ....................... 73/862.332, 862.333, 73/862.334, 862.335, 862.191

(56) References Cited

U.S. PATENT DOCUMENTS

| | | | |
|---|---|---|---|
| 4,632,049 | * 12/1986 | Hall et al. ............................. | 114/150 |
| 4,697,460 | * 10/1987 | Sugiyama et al. .............. | 73/862.333 |
| 5,097,714 | * 3/1992 | Kabuto et al. .................. | 73/862.191 |
| 5,924,520 | * 7/1999 | Ehara et al. .......................... | 188/444 |

FOREIGN PATENT DOCUMENTS 8-2431    1/1996   (JP) .

* cited by examiner

Primary Examiner—Max Noori
(74) Attorney, Agent, or Firm—Armstrong, Westerman, Hattori, McLeland & Naughton

(57) ABSTRACT

Coils 38 and magnetostriction elements 41 are disposed inside casings 32, 33 fixed to a driving pulley housing 2, and an end of an outer tube 5o of a Bowden cable 5 is brought into abutment with the magnetostriction element 41 via a slider 42. When a steering torque is inputted into the steering wheel and an inner cable 5i is pulled in a direction indicated by an arrow B, an axial compression force acting on the outer tube 5o is transmitted to the magnetostriction element 41 via the slider 42 and a compression load p is applied thereto. This changes the magnetic permeability of the magnetostriction element 41, thereby changing the inductance of the coil 38, whereby the steering torque acting on the steering wheel can be detected based on the change in inductance. The torque detecting device for a cable-type steering device according to the present invention can securely detect a steering torque applied to a steering wheel with a simple construction and also can secure the rigid feel of the steering wheel to thereby prevent the deterioration of the steering feel.

6 Claims, 8 Drawing Sheets

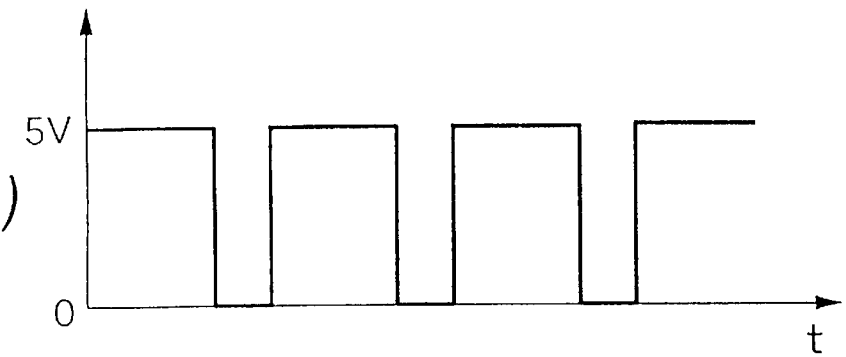
FIG. 7 (A)
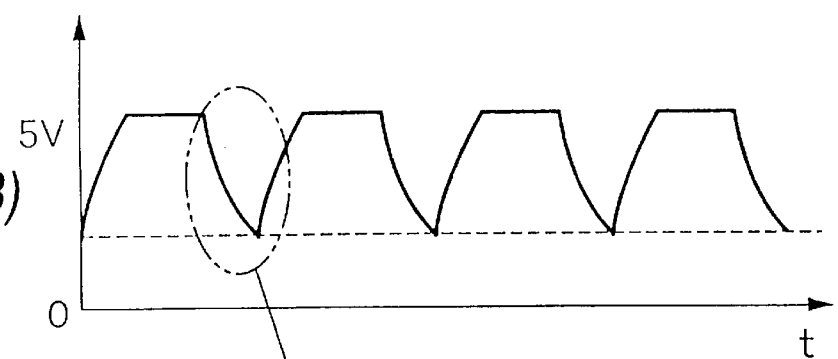
FIG. 7 (B)
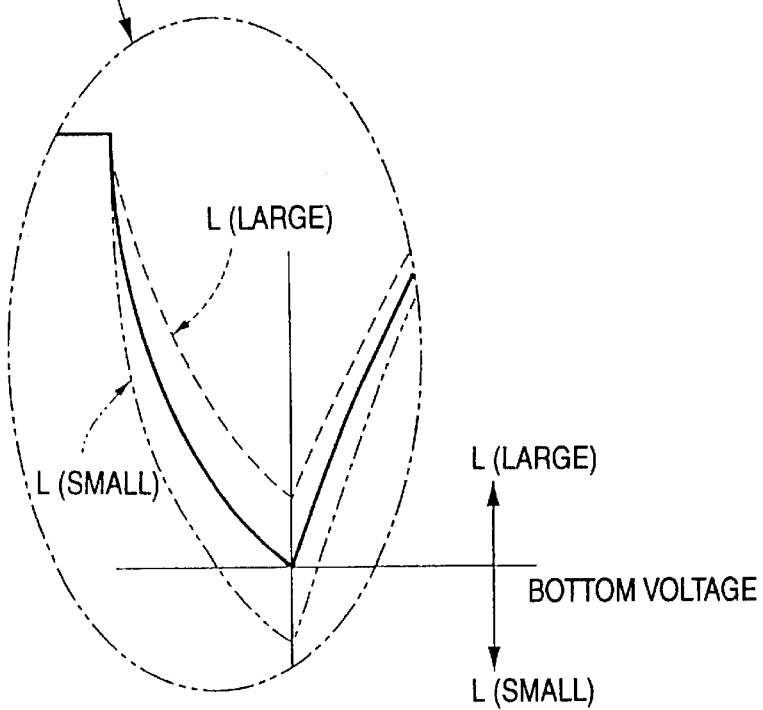

STEERING TORQUE DETECTING DEVICE FOR CABLE-TYPE STEERING DEVICE

BACKGROUND OF THE INVENTION

1. Field of the Invention

The present invention relates to a cable-type steering device in which a steering wheel is connected with a steering gearbox with cables, such as Bowden cables, and more particularly, to a steering torque-detecting device for the cable-type steering device.

2. Description of the Prior Art

A cable-type steering device is proposed in which a flexible transmission means, such as a Bowden cable, replaces a steering shaft for connecting a steering wheel with a steering gearbox (for example, as shown in Japanese Patent Unexamined Publication No. Hei. 8-2431). Adopting such a cable-type steering device enables not only the free selection of a position for the steering wheel relative to the position of the steering gearbox but also the transmission of less vibrations of the steering gearbox to the steering wheel.

In a case where a power steering device is combined with a cable-type steering device, such as described above, it is necessary to detect a steering torque that is to be inputted into a steering wheel in order to control the operation of an assist motor. In a conventional steering torque-detecting device, a potentiometer is disposed between a pair of cables extending from a driving pulley, and rollers provided at ends of a V-shaped detecting arm fixed to a detecting shaft of the potentiometer are adapted to be brought into elastically springing abutment with the pair of cables, respectively. When a steering torque applied to the steering wheel rotates the driving pulley, the tension of one of the pair of cables increases, while that of the other decreases, and this rotates, together with the detecting shaft, the detecting arm, the roller of which is pressed against the cable, the tension of which increases, whereby the output from the potentiometer is changed, a steering torque being thereby detected.

With the conventional steering torque-detecting device described above, however, since there are provided therein a number of components and moving portions, the construction of the device becomes complicated, resulting in a drawback that it is difficult to secure sufficient durability. In addition, since the detecting arm generates micro-vibrations when an inner cable made of a stranded metal wire comprising a metallic strand moves along the roller while rotating it, micro-vibrations so-generated are then transmitted to the detecting shaft of the potentiometer leading to a drawback that the detection accuracy of the potentiometer is deteriorated. Moreover, since the inner cable is bent in a substantially V-shape at a portion where it abuts with the roller in response to the fluctuation in tension of the cable itself, there is also provided a drawback that the rigid feeling of the steering wheel is lowered, whereby the steering feeling is deteriorated.

SUMMARY OF THE INVENTION

The present invention was made in view of the aforementioned disadvantageous circumstances and, accordingly, an object thereof is to provide a cable-type steering device that can securely detect a steering torque inputted into the steering wheel with a simple construction and which can prevent the deterioration of the steering feel by maintaining a rigid feeling of the steering wheel.

To attain the above object, according to the present invention, there is provided a torque, detecting device for a cable-type steering device. The cable-type steering device comprises a driving pulley connected to a steering wheel, a follower pulley connected to a steering gearbox for turning vehicle wheels, and a pair of cables for connecting the driving pulley with the follower pulley for transmission of a steering torque therebetween. Each of the pair of cables comprises an outer tube and an inner cable. The outer tube is supported at one end thereof on a driving pulley housing accommodating therein the driving pulley, while the inner cable is wound around the driving pulley. The torque-detecting device comprises a pair of coils fixed, one to each of the driving pulley housings and a pair of magnetostriction elements which are disposed with respect to each of the pair of coils, in such a manner that an axial compression force acting on the outer tube in accordance with the tension of the inner cable is applied to the magnetostriction element, and that a steering torque inputted into the steering wheel is detected based on the change in inductance of the coil in response to the change in magnetic permeability of the magnetostriction element.

According to the above construction, when a steering torque is inputted in the steering wheel to rotate the same, the tension of one of the inner cables increases, while the tension of the other decreases, and the outer tube accommodating therein the inner cable, the tension of which is increased, is pulled in the same direction as that in which the inner cable is pulled, whereby an axial compression force is generated. When the axial compression force, so generated, is applied to the magnetostriction element disposed in the interior of the coil fixed to the driving pulley housing, the magnetic permeability of the magnetostriction element is changed, which changes the inductance of the coil, whereby a steering torque can be detected based on the change in inductance. Thus, with the simple construction of the above detecting device, since no moving portion is provided and not many components are used, a steering torque can be positively detected with high reliability, and, moreover, since there is generated no deflection in the cables, the rigid feel of the steering wheel can be maintained to thereby prevent the deterioration in steering feel.

Furthermore, in the above-mentioned construction of the torque detecting device according to the present invention, it is preferable that the magnetostriction element is made of a annular shape, and the inner cable penetrates through the interior of the annularly shaped magnetostriction element.

According to the above construction, since the inner cable penetrates through the interior of the annularly shaped magnetostriction element, not only can an axial compression force applied to the outer tube accommodating therein the inner cable effectively be transmitted to the magnetostriction element, but also the magnetostriction element can be disposed compactly relative to the inner cables.

BRIEF DESCRIPTION OF THE DRAWINGS

FIG. 7 is a diagram showing input and output waveforms of the steering torque detection circuit.

DETAILED DESCRIPTION OF THE PREFERRED EMBODIMENTS

Referring to an embodiment of the present invention shown in the accompanying drawings, a preferable embodiment of the invention will be described below.

Figure 1:
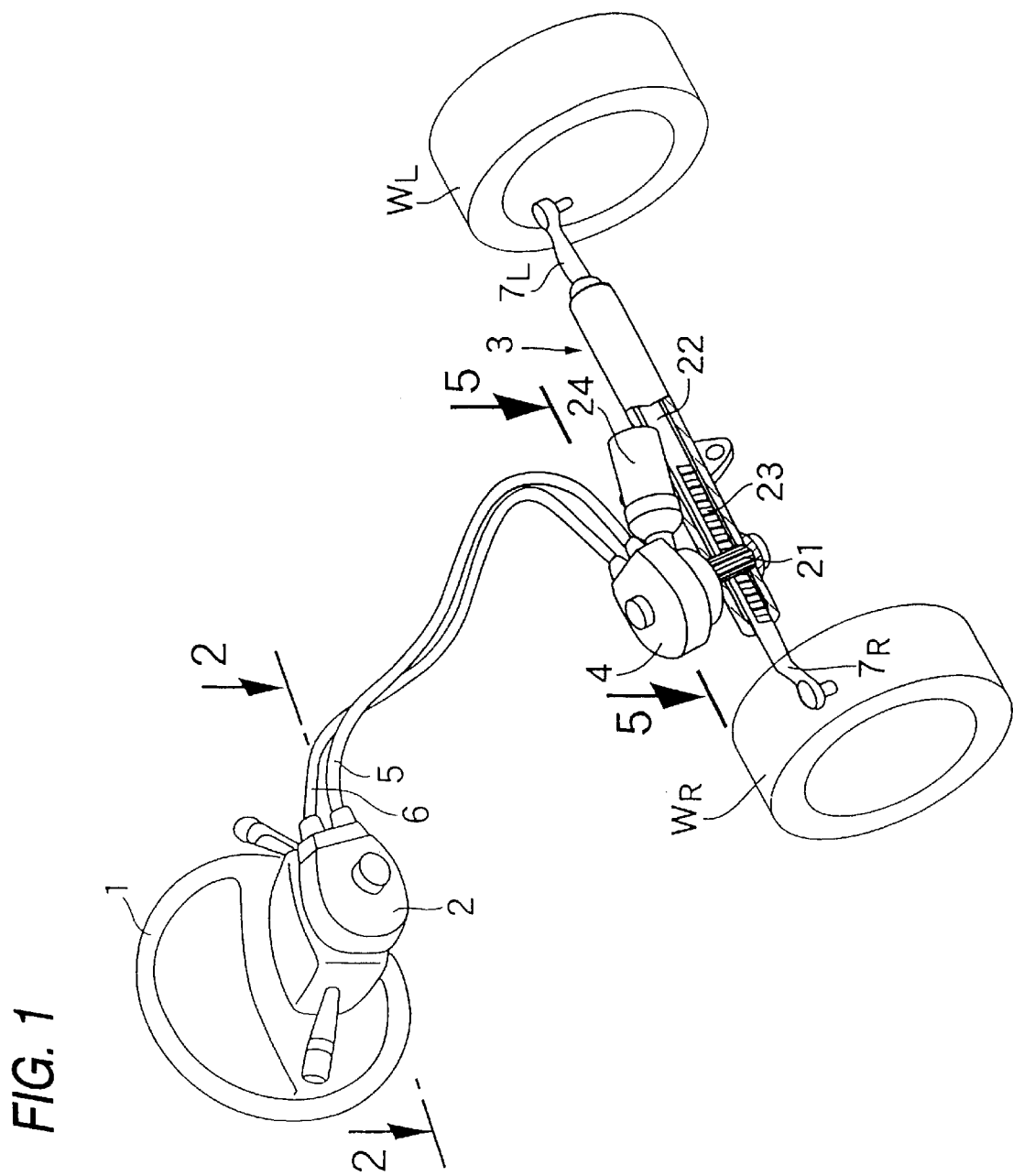
FIG. 1 is a perspective view showing the entirety of a cable-type steering device incorporating the present invention.

FIGS. 1 to 8 show one embodiment of the present invention. FIG. 1 is an overall perspective view of a cable-type steering device incorporating the invention, FIG. 2 an enlarged sectional view taken along the line 2—2 of FIG. 1, FIG. 3 a sectional view taken along the line 3—3 of FIG. 2, FIG. 4 an enlarged sectional view taken along the line 4—4 of FIG. 3, FIG. 5 an enlarged sectional view taken along the line 5—5 of FIG. 1, FIG. 6 a diagram showing a steering torque detecting circuit, FIG. 7 a diagram showing input and output waveforms of the steering torque detecting circuit, and FIG. 8 an explanatory diagram explaining a process for calculating a steering torque based on an output from a steering torque sensor.

As shown in FIG. 1, a driving pulley housing 2 provided in front of a steering wheel 1 is connected to a follower pulley housing 4 provided above a steering gearbox 3 with two Bowden cables 5, 6. Tie-rods $7_L$, $7_R$ extending, respectively, leftward and rightward from ends of the steering gearbox 3 are connected to knuckles (not shown) for supporting left and right wheels $W_L$, $W_R$, respectively.

Figure 2:
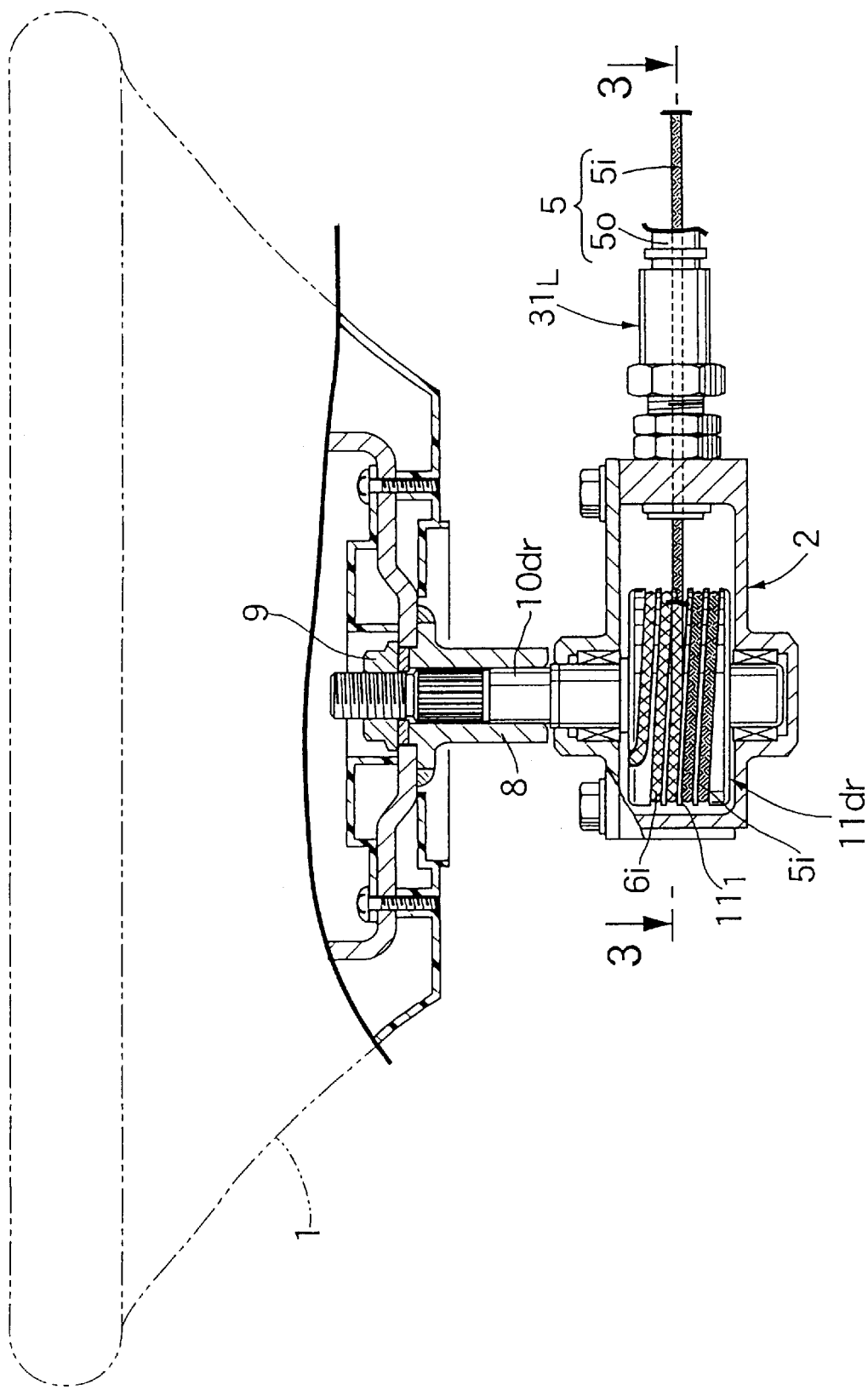
FIG. 2 is an enlarged sectional view taken along the line 2—2 of FIG. 1.
Figure 3:
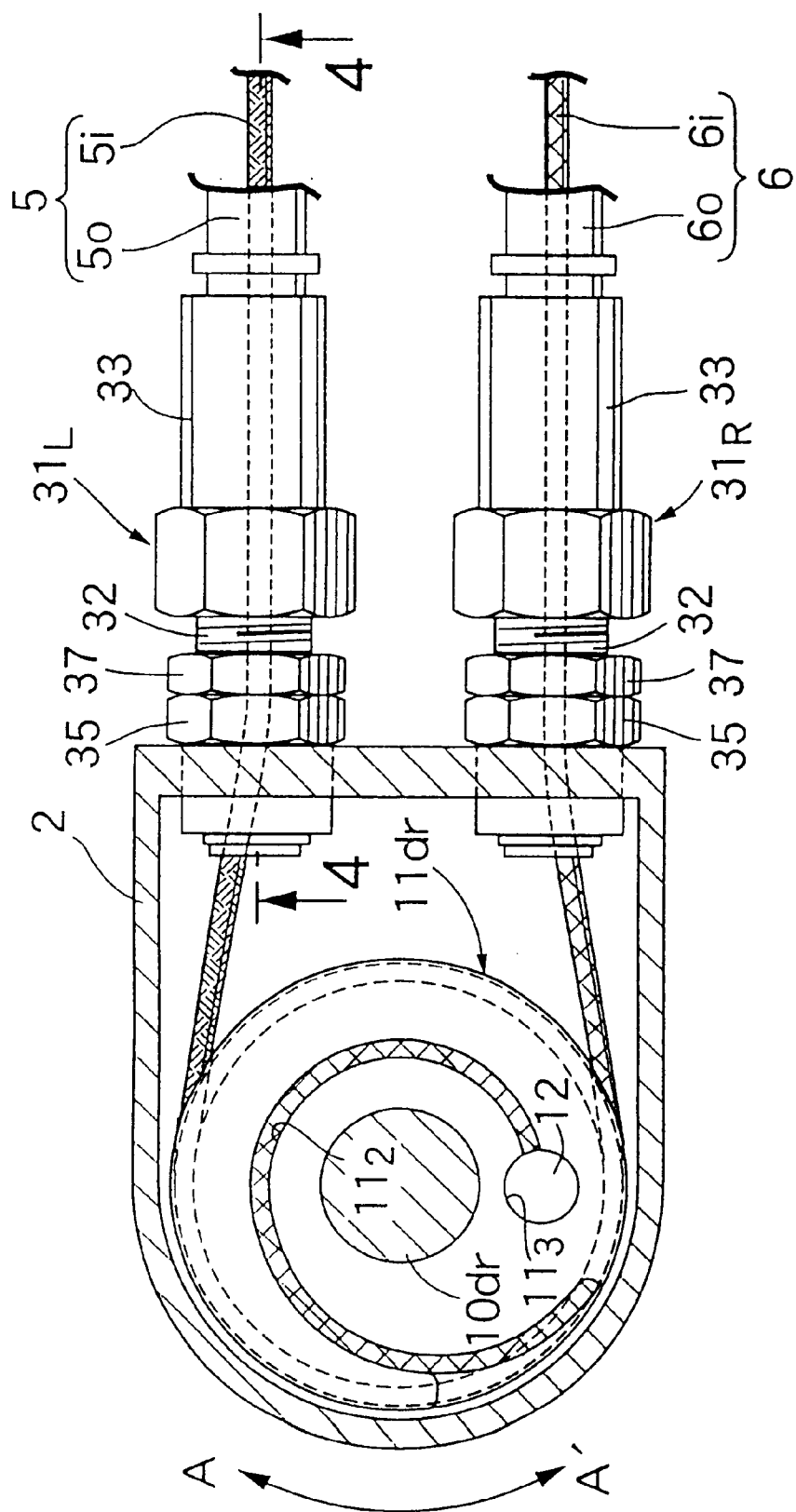
FIG. 3 is a sectional view taken along the line 3—3 of FIG. 2.

As shown in FIGS. 2 and 3, a rotating shaft 10dr fixed to a boss portion 8 of the steering wheel 1 with a nut 9 is rotatably supported in the driving pulley housing 2, and a driving pulley 11dr is fixed to this rotating shaft 10dr. The two Bowden cables 5, 6 each comprise an outer tube 5o, 6o and an inner cable 5i, 6i slidably accommodated therein. A pulley groove $11_1$ is spirally formed in the outer circumference of the driving pulley 11dr, and formed in each side surface thereof are a fixed groove $11_2$, $11_2$ and a pin hole $11_3$, $11_3$. The fixed grooves $11_2$, $11_2$ are formed so as to continue to ends of the pulley groove $11_1$, respectively, and the pin holes $11_3$, $11_3$ are formed so as to continue to ends of the fixed grooves $11_2$, $11_2$, respectively. Pins 12, 12 each fixed to one end of the respective inner cables 5i, 6i of the Bowden cables 5, 6 are fitted, respectively, in the pin holes $11_3$, $11_3$ in the driving pulley 11dr and then the inner cables 5i, 6I are wound around, respectively, from the fixed grooves $11_2$, $11_2$ to the pulley groove $11_1$ and are thereafter taken out of the diametrical end of the driving pulley in a diametrical direction.

A pair of torque sensors $31_L$, $31_R$ are provided, respectively, at portions where the outer tubes 5o, 6o of the Bowden cables 5, 6 are attached to the driving pulley housing 2. Since the pair of torque sensors $31_L$, $31_R$ have the same construction, as a representative of both, the construction of the torque sensor $31_L$ on the side of the Bowden cable 5 will be described, while referring to FIG. 4.

The torque sensor $31_L$ comprises a first casing 32 and a second casing 33, and one end of the first casing 32 is fitted in one end of the second casing 33 and they are screw connected to each other thereat. The other end of the first casing 32 is screw connected to a mounting member 35 fixed to the driving pulley housing 2 and is locked with a lock nut 37 in such a manner as not to rotate. A bobbin 39 having a coil 38 wound around its outer circumference is disposed at a portion where the first casing 32 and the second casing 33 are connected to each other and is then axially positioned with a washer 40. A magnetostriction element 41 made of a magnetostrictive material and formed into a cylindrical shape is fitted in the inner circumferential surface of the bobbin 39. The magnetostriction element 41 is disposed at a position substantially corresponding to an inside of the coil 38 in the radial direction. The magnetostriction element 41 comprises a material which changes its magnetic permeability in response to a load applied thereto.

A slider 42 formed into a stepped cylindrical shape has a large diameter portion $42_1$ and a small diameter portion $42_2$ and is axially slidably supported on the inner circumferential surface of the second casing 33 via a synthetic resin bearing 43 provided on the outer circumference of the large diameter portion $42_1$. An end of the small diameter portion $42_2$ of the slider 42 is slidably fitted in a guide portion $39_1$ formed integrally with the bobbin 39 and abuts against the magnetostriction element 41 via a cylindrical spacer 44. An end of the outer tube 5o of the Bowden cable 5 penetrates through the other end of the second casing 33 and fits in the large diameter portion $42_1$ of the slider 42. A spiral metallic belt-like material 45 and a number of thin resin sleeves 46 extending axially are disposed on an inner circumferential surface of the outer tube 5o in order to prevent the Bowden cable 5 from being bent drastically, and the inner cable 5i sidably fits in the inside of the resin sleeves 46. The inner cable 5i extending outwardly from the outer tube 5o penetrates through the slider 42, spacer 44, magnetostriction element 41 and a guide member 47 held in the interior of the first casing 32, and is then led into the interior of the driving pulley housing 2.

A lead wire 48 extending from the coil 38 wound around the bobbin 39 penetrates through the first casing 32 to be connected to a control device not shown.

Figure 5:
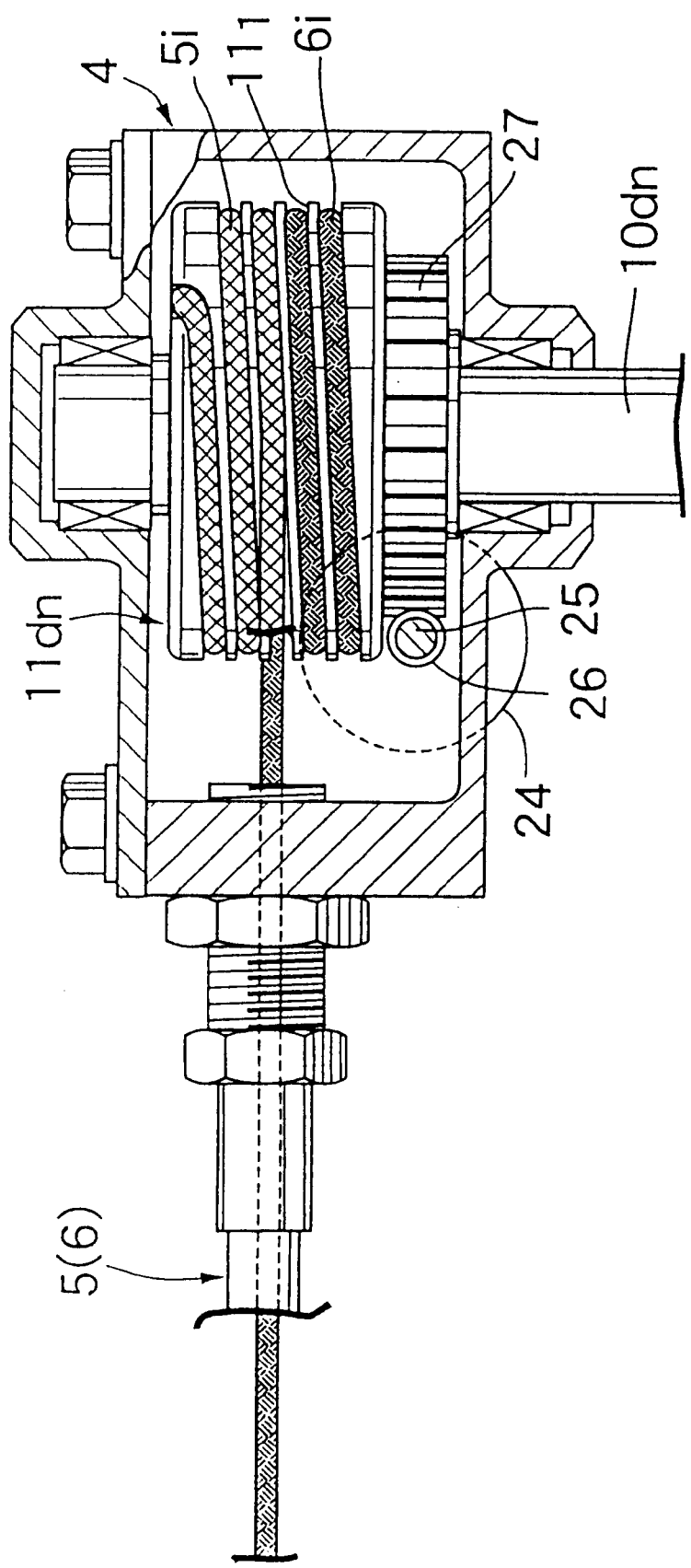
FIG. 5 is an enlarged sectional view taken along the line 5—5 of FIG. 1.

As shown in FIGS. 1 and 5, a follower pulley 11dn is fixed to the rotating shaft 10dn rotatably supported on the follower pulley housing 4. The both inner cables 5i, 6i are wound a plurality of times around at the other ends thereof a spiral groove 111 formed in the outer circumference of the follower pulley 11dn to be fixed thereat, and the outer tubes 5o, 6o of the both Bowden cables 5, 6 are fixed at the other ends thereof to the follower pulley housing 4. A pinion 21 is provided at a distal end of the rotating shaft 10dn which protrudes from the follower pulley housing 4 into the interior of the steering gearbox 3, and this pinion 21 is in mesh engagement with a rack 23 formed in a steering rod 22 supported transversely slidably in the interior of the steering gearbox 3.

A power steering motor 24 is supported on the follower pulley housing 4 as a power assist means, and a worm 26 provided on an output shaft 25 is in mesh engagement with a worm wheel 27 provided on the rotating shaft 10dn inside the follower pulley housing 4. Therefore, the torque of the power steering motor 24 is transmitted to the rotating shaft 10dn via the worm 26 and worm wheel 27.

Figure 6:
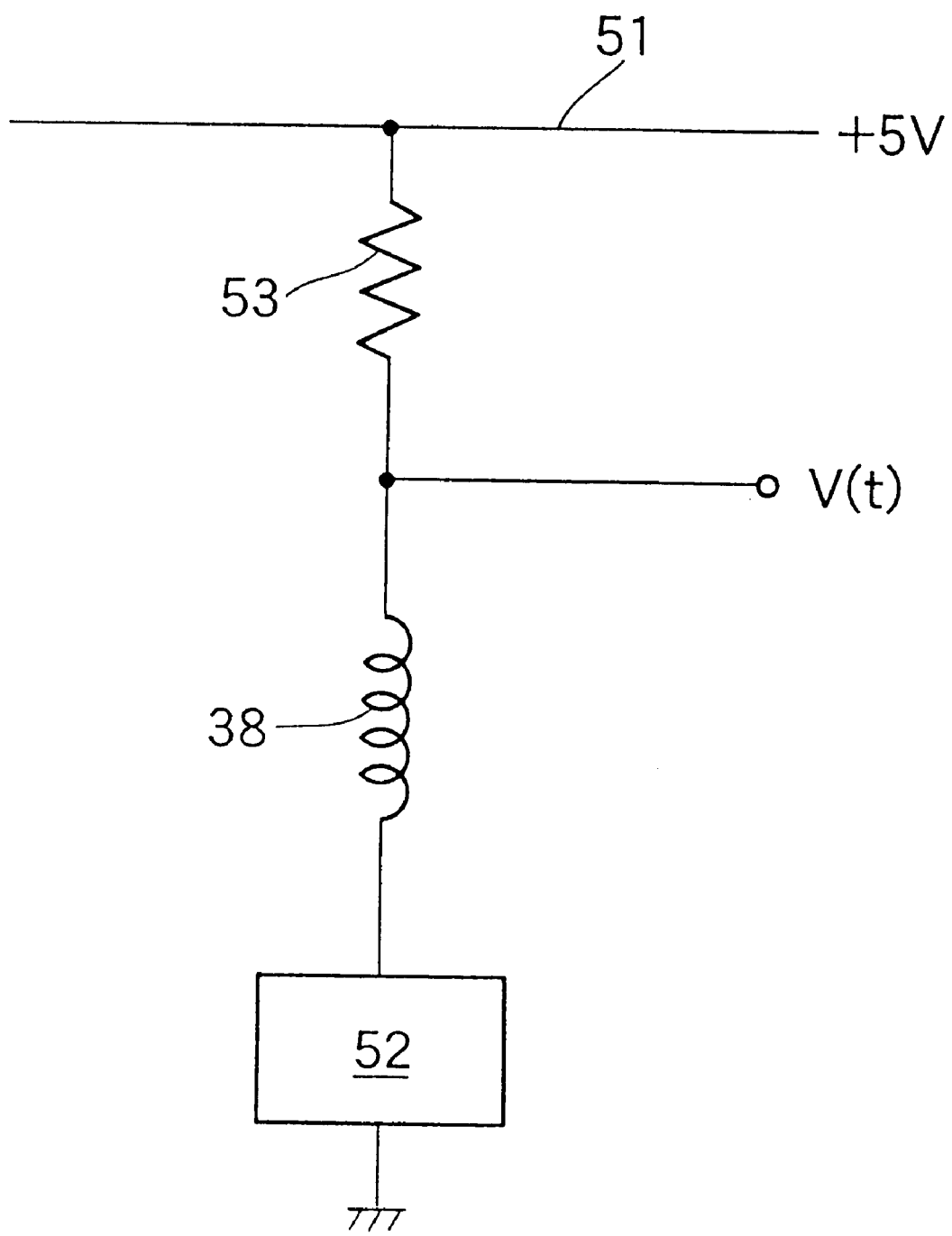
FIG. 6 is a diagram showing a steering torque detection circuit.
Figure 8:
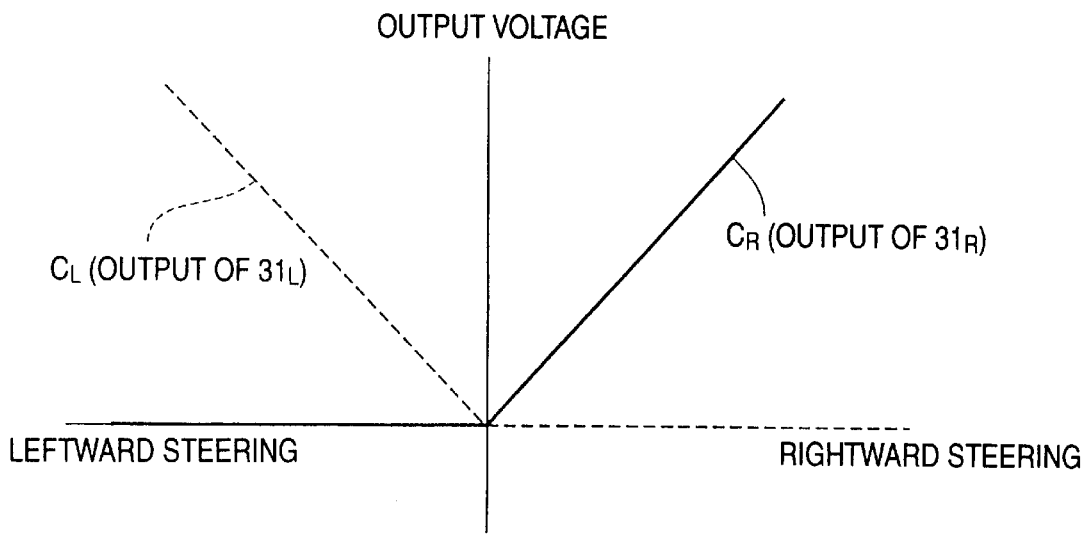
FIG. 8 is an explanatory diagram explaining a process for calculating a steering torque based on an output from the steering torque sensor.
Figure 8:
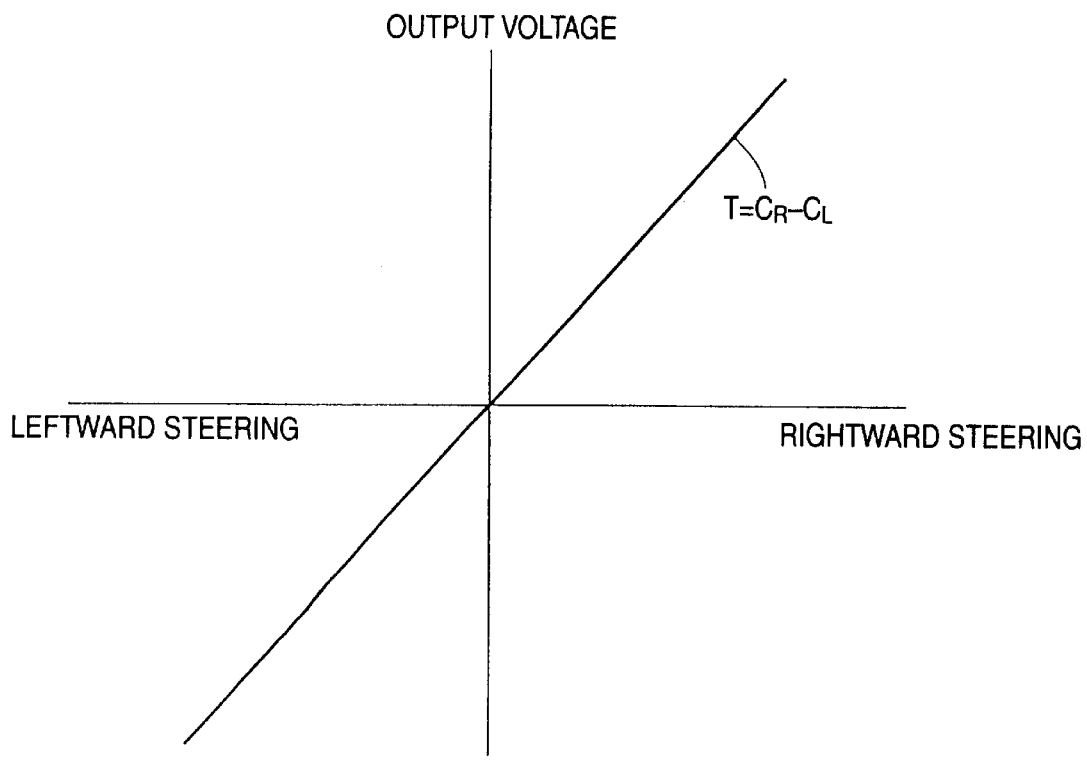

FIG. 6 shows a diagram showing a circuit for detecting a steering torque in which a resistance 53 and the coil 38 are connected in series to each other between a power source 51 of 5 volts and a pulse signal generation means 52, and a sensor output V(t) is taken of out between the resistance 53 and the coil 38.

Next, an operation of the embodiment of the present invention will be described.

When the steering wheel 1 is operated so as to rotate the rotating shaft 10dr in a direction indicated by an arrow A in FIG. 3 in order to turn the vehicle, one of the inner cables 6i of the Bowden cables 5, 6 wound around the driving pulley 11dr is tensioned, and the other is loosened, whereby the rotation of the driving pulley 11dn is transmitted to the follower pulley 11dn. As a result of this, the rotating shaft 10dn of the follower pulley 11dn shown in FIG. 5 rotates, and a steering torque is transmitted to the wheels $W_L$, $W_R$ via the pinion 21, rack 23 and steering rod 22 in the steering gearbox 3. On the contrary, when the steering wheel 10dr is rotated in a direction indicated by an arrow A' in FIG. 3, and the other cable 5i of the Bowden cables 5, 6 is tensioned, one of the inner cables 6i is loosened, whereby the rotation of the driving pulley 11dr is transmitted to the follower pulley 11dn, this allowing a steering torque to be transmitted to the wheels $W_L$, $W_R$ in a reverse direction.

Figure 4:
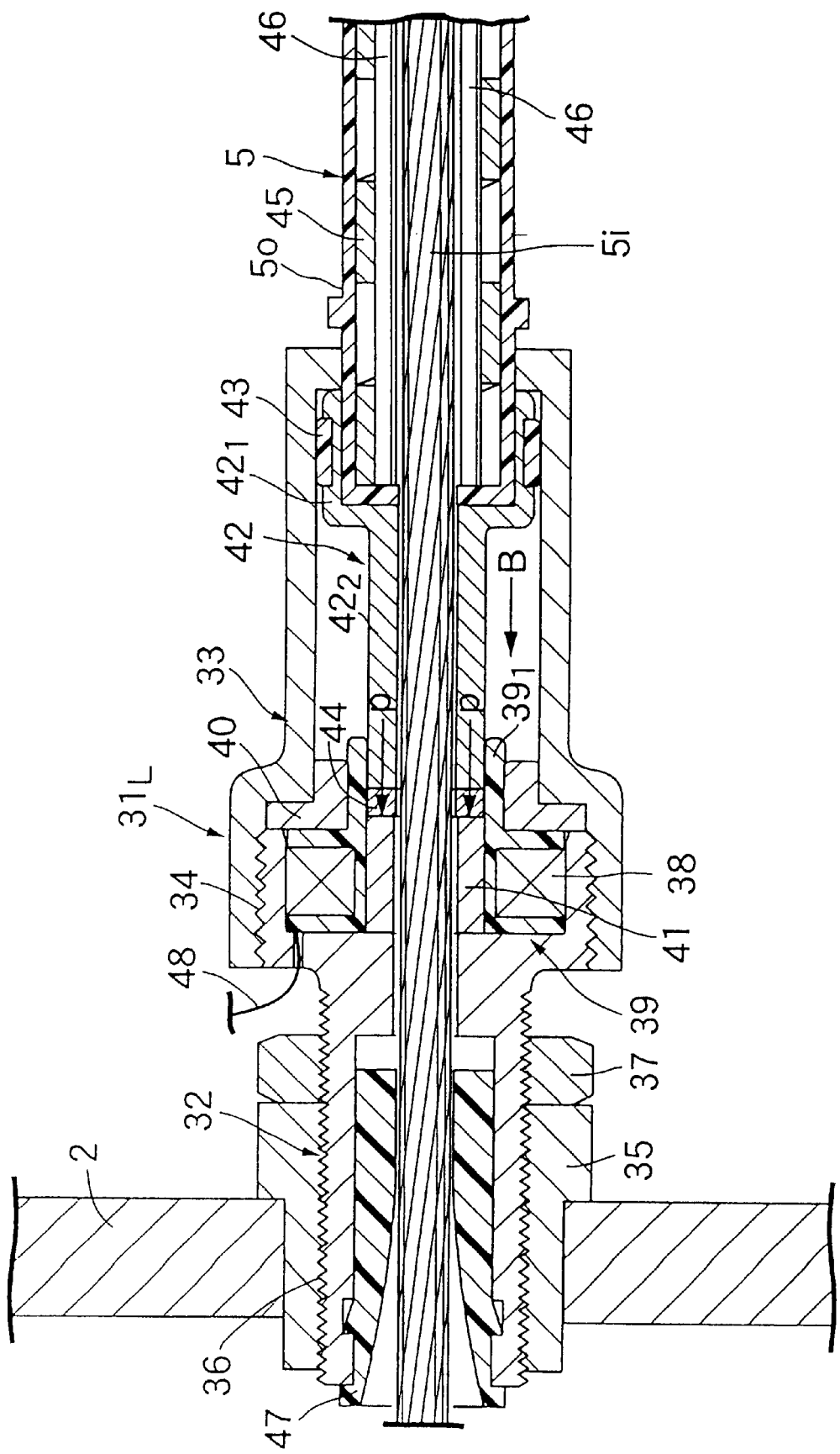
FIG. 4 is an enlarged sectional view taken along the line 4—4 of FIG. 3.

When the inner cable 5i is pulled by the rotation of the driving shaft 10 in the direction indicated by the arrow A' in FIG. 3, a compression load is applied to the outer tube 5o by the inner cable 5i so pulled in a direction shown by an arrow B in FIG. 4. The compression load of the outer tube 5o is transmitted to the magnetostriction element 41 via the slider 42 and spacer 44, and this magnetostriction element 41 is compressed under an axial load (p) and the magnetic permeability thereof is changed. The inductance L of the above coil 38 is given by the following equation:

$$L = k \times \mu_0 \times \mu_T(p) \times \pi r^2 / (a \times N^2)$$

where, r is the radius of the coil 38, a is the length of the coil 38, N is the number of times of windings of the coil 38, $\mu_0$ is the magnetic permeability of air, $\mu_T(p)$ is the magnetic permeability of the magnetostriction element 41 that is changed by the load p and k the Nagaoka coefficient. This Nagaoka coefficient k can be obtained from the conversion table using 2r/a as a parameter.

As is clear from the above equation, since the magnetic permeability $\mu_T(p)$ of the magnetostriction element 41 changes when the load p is applied thereto and thereby the inductance L of the coil 38 changes, the load p acting on the magnetostriction element 41 can be detected based on the change in inductance. In addition, since the load p is proportional to a tension applied to the inner cable 5i, i.e., a steering torque applied to the steering wheel, the steering torque can be detected based on the change in inductance L of the coil 38.

To describe this further, when the pulse signal generating means 52 in the circuit shown in FIG. 6 outputs a square wave as shown in FIG. 7(A), the fall portion of the sensor output V(t) shown in FIG. 7(b) is given by $V(t)=5 \times \exp(-Rt/L)$. The bottom voltage of the sensor output V(t) increases as the inductance L of the coil 38 increases, and the former decreases as the later decreases, and therefore, the tension of the inner cables 5i, 6i can be detected using this bottom voltage as the output voltage.

Thus, as shown in FIG. 8(A), when the steering wheel 1 is steered in the rightward direction, the output voltage of the steering torque sensor $31_R$ increases in a linear fashion with the output voltage of the torque sensor $31_L$ being held at zero, and, on the contrary, when the steering wheel 1 is steered in the leftward direction, the output voltage of the steering torque sensor $31_L$ increases in a linear fashion with the output voltage of the steering torque sensor $31_R$ being held at zero. Therefore, as shown in FIG. 8(B), the steering torque $T=C_R-C_L$ can be obtained by calculating a difference between the output voltages of the two steering torque sensors $31_L$, $31_R$.

Since the steering torque of the steering wheel 1 is detected as described above, an assist torque is generated at the power steering motor 24 to cancel the steering torque so detected so as to maintain the tension of the Bowden cables 5, 6 constant, whereby preferred power steering assist properties can be obtained.

Thus, since a steering torque can be detected by changing the magnetic permeability of the magnetostriction element 41 by a compression load applied to the outer tubes 5o, 6o generated as the steering wheel 1 is operated, there are provided fewer components and no moving portions, thereby making it possible to construct the steering torque sensors $31_L$, $31_R$ very simply. Moreover, since there is no possibility that the inner cables 5i, 6i of the Bowden cables 5, 6 do not bend and that the outer tubes 5o, 6o do not move axially, the rigid feel of the steering wheel 1 can be secured, whereby the steering feel can be improved. Furthermore, since the magnetostriction elements 41 and coils 38 are disposed coaxially so as to surround the outer circumference of the inner cables 5i, 6i, not only can the steering torque sensors $31_L$, $31_R$ be constructed compact but also a compression load from the outer tubes 5o, 6o can effectively be transmitted to the magnetostriction elements 41.

Although the embodiment of the present invention has been described in detail, the design of the present invention can be modified variously without departing from the sprit and scope thereof.

For instance, in this embodiment, the steering device is described such that the power steering motor 24 assists the driver in steering the steering wheel, but the present invention may be applied to a manual steering device in which only loads transmitted via the Bowden cables 5, 6 can be used for steering.

Thus, according to the invention, when a steering torque is inputted into the steering wheel so as to rotate the driving pulley, the tension of one of the two inner cables increases, while that of the other decreases, and the outer tube accommodating therein the inner cable the tension of which is increased is pulled in the same direction as that in which the inner cable is pulled, whereby an axial compression force is generated. When the axial compression force so generated is applied to the magnetostriction element disposed in the interior of the coil fixed relative to the driving pulley housing, the magnetic permeability of the magnetostriction element is changed, which changes the inductance of the coil, whereby a steering torque can be detected based on the change in inductance. Thus, with the simple construction of the above detecting device, since no moving portion is provided and not many components are used, a steering torque can securely be detected with high reliability, and moreover since there is generated no deflection in the cables, the rigid feel of the steering wheel can be secured to thereby prevent the deterioration in steering feel.

Furthermore, according to the invention, since the inner cable penetrates through the interior of the annularly formed magnetostriction element, not only can an axial compression force applied to the outer tube accommodating therein the inner cable effectively be transmitted to the magnetostriction element, but also the magnetostriction element can be disposed compact relative to the inner cables.

The present invention is based on Japanese Patent Application No. Hei. 10-193379, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A torque detecting device for a cable-type steering device, said cable-type steering device comprising: a driving pulley connected to a steering wheel; a driving pulley housing accommodating therein said driving pulley; a follower pulley connected to a steering gearbox which turns vehicle wheels; first and second cables connecting said driving pulley with said follower pulley for transmission of a steering torque therebetween, each of said first and second cables including an outer tube and an inner cable, wherein said outer tube is supported at one end thereof on said driving pulley housing while said inner cable is wound around said driving pulley, said torque detecting device comprising:

a first coil fixed in a first casing portion of said driving pulley housing;

a first magnetostriction element disposed with respect to said first coil in such a manner that an axial compression force acting on said outer tube of said first cable in accordance with a tension loading of said inner cable of said first cable is applied to said first magnetostriction element to change the inductance of said first coil;

a second coil fixed in a second casing portion of said driving pulley housing; and a second magnetostriction element disposed with respect to said second coil in such a manner that an axial compression force acting on said outer tube of said second cable in accordance with a tension loading of said inner cable of said second cable is applied to said second magnetostriction element to change the inductance of said second coil; and means for determining the change in inductance in the said coils.

2. The torque detecting device according to claim 1, wherein each of said first and second magnetostriction elements is formed into an annular shape, and said inner cables, respectively, penetrate through the interiors of said annularly formed magnetostriction elements.

3. The torque detecting device according to claim 1, further comprising:

a first slider movable relative to said driving pulley housing and disposed between said first magnetostriction element and said outer tube of said first cable in an axial direction of said inner cable of said first cable; and a second slider movable relative to said driving pulley housing and disposed between said second magnetostriction element and said outer tube of said second in an axial direction of said inner cable of said second cable.

4. A torque detecting device for a cable-type steering device, said cable-type steering comprising: a driving pulley connected to a steering wheel; a driving pulley housing accommodating therein said driving pulley; a follower pulley connected to a steering gearbox which turns vehicle wheels; a cable connecting said driving pulley with said follower pulley for transmission of a steering torque therebetween, said cable including an outer tube is supported at one end thereof on said driving pulley housing while said inner cable is wound around said driving pulley, said torque detecting device comprising:

a coil fixed in a casing portion of said driving pulley housing; and a magnetostriction element disposed with respect to said coil in such a manner that an axial compression force acting on said outer tube in accordance with a tension loading of said inner cable of said cable is applied to said magnetostriction element to change an inductance of said coil.

5. The torque detecting device according to claim 4, wherein said magnetostriction element is formed into an annular shape, and said inner cable penetrates through the interior of said angularly shaped magnetostriction element.

6. The torque detecting device according to claim 4, further comprising:

a slider movable relative to said driving pulley housing and disposed between said magnetostriction element and said outer tube in an axial direction of said inner cable to impose a force on said magnetostriction element corresponding to the extent of axial movement of said slider.

* * * * *